(12) United States Patent
Schumann et al.

(10) Patent No.: US 9,653,710 B2
(45) Date of Patent: May 16, 2017

(54) ELECTRICAL ENERGY STORES, AND METHOD FOR OPERATING AN ELECTRICAL ENERGY STORE

(71) Applicant: Robert Bosch GmbH, Stuttgart (DE)

(72) Inventors: Bernd Schumann, Rutesheim (DE); Joerg Thielen, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 25 days.

(21) Appl. No.: 14/677,461

(22) Filed: Apr. 2, 2015

(65) Prior Publication Data
US 2015/0295208 A1 Oct. 15, 2015

(30) Foreign Application Priority Data
Apr. 9, 2014 (DE) .................. 10 2014 206 813

(51) Int. Cl.
| | | |
|---|---|---|
| *H01M 4/00* | (2006.01) | |
| *H01M 2/02* | (2006.01) | |
| *H01M 10/48* | (2006.01) | |
| *H01M 2/10* | (2006.01) | |
| *H01M 10/04* | (2006.01) | |

(52) U.S. Cl.
CPC .......... *H01M 2/02* (2013.01); *H01M 2/1016* (2013.01); *H01M 10/0481* (2013.01); *H01M 10/48* (2013.01)

(58) Field of Classification Search
CPC .... H01M 10/0481; H01M 10/48; H01M 2/02; H01M 2/1016
See application file for complete search history.

(56) References Cited

U.S. PATENT DOCUMENTS

| | | | | |
|---|---|---|---|---|
| 5,786,980 A | * | 7/1998 | Evans ...................... | H01G 9/08 174/17 GF |
| 2010/0035128 A1 | | 2/2010 | Scordilis-Kelley et al. | |
| 2012/0244393 A1 | * | 9/2012 | Stanek ................. | H01M 2/1077 429/50 |
| 2013/0266832 A1 | * | 10/2013 | Shirasawa ........... | H01M 2/1077 429/61 |

FOREIGN PATENT DOCUMENTS

| | | |
|---|---|---|
| DE | 10 2012 213091 | 1/2014 |
| DE | 10 2012 018128 | 3/2014 |
| EP | 07 00 109 | 3/1996 |

* cited by examiner

*Primary Examiner* — Patrick Ryan
*Assistant Examiner* — Ben Lewis
(74) *Attorney, Agent, or Firm* — Gerard Messina

(57) ABSTRACT

An electrical energy store and a method for operating an electrical energy store are described. The electrical energy store includes: a housing; at least one energy storage element situated in the housing; and at least one gas-tight cavity, to which an internal pressure is applicable, situated in the housing, with the aid of which a pressure is exertable on at least one section of the energy storage element by applying the internal pressure to the cavity.

9 Claims, 9 Drawing Sheets

ELECTRICAL ENERGY STORES, AND METHOD FOR OPERATING AN ELECTRICAL ENERGY STORE

RELATED APPLICATION INFORMATION

The present application claims priority to and the benefit of German patent application no. 10 2014 206 813.4, which was filed in Germany on Apr. 9, 2014, the disclosure of which is incorporated herein by reference.

FIELD OF THE INVENTION

The present invention relates to an electrical energy store as well as to a method for operating an electrical energy store.

BACKGROUND INFORMATION

Today, numerous demands are placed on electrical energy stores, for example, batteries or rechargeable batteries, so that they may serve, for example, as energy stores for power from solar cells or wind power plants, vehicles or mobile electronic devices. In this context, the long service life of such energy stores is of great importance. In some types of energy stores it may be advantageous if energy storage elements, for example, energy storage cells or electrode windings or their components, for example, electrodes, of the energy store are under a defined pressure.

In US 2010/0035128 A1 a system and a method are described for the improvement of the efficiency of electrochemical cells by applying a force. An electromechanical cell is described which includes a cathode and an anode; an electrolyte is introduced between them, which establishes an ion-conductive connection between the anode and the cathode. The cell is configured and positioned in such a way that during at least one time period during a charging and/or a discharging of the cell an anisotropic force is exerted perpendicularly to the active surface of the anode using a component.

SUMMARY OF THE INVENTION

The present invention provides an electrical energy store having the features of patent claim 1 and a method having the features of patent claim 9.

Accordingly, an electrical energy store is provided including: a housing; at least one energy storage element situated in the housing, in particular an electrochemical energy storage element; and at least one gas-tight cavity, to which an internal pressure is applicable, situated in the housing, with the aid of which a pressure is exertable on at least one section of the energy storage element by applying the internal pressure to the cavity.

In other words, the gas-tight cavity, to which the internal pressure is applicable, is introduced into the housing of the electrical energy store in such a way that it exerts or may exert a pressure on the at least one section of the energy storage element situated in the housing. The housing may be gas-tight.

Moreover, a method for operating an electrical energy store is provided including the step: applying an internal pressure on a gas-tight cavity, to which the internal pressure is applicable, whereby a pressure is exerted on at least one section of an energy storage element situated in the housing.

An electrical energy store is in particular to be understood to mean the device with the aid of which a voltage and/or an electric current may be provided. This may be in particular a battery pack including multiple electrochemical energy storage elements. Such electrochemical energy storage elements may advantageously be, for example, lithium-ion batteries or lithium-sulfur cells, in which metallic anodes made of lithium are used. The electrochemical energy storage elements may be configured or arranged as single cells, as a stack, as cell windings and/or as cell stacks.

The gas-tight cavity, to which the internal pressure is applicable, inside the housing may be a gas container, for example, which may be made of flexible plastic. The cavity may also be a gas bag. A gas bag may be configured in such a way that it has essentially no volume except for a thickness of its outer walls at very low or vanishing internal pressure of the gas bag. The cavity may be made from, for example, a polymer, for example, gas-impermeable nylon, 1,4-Polyisoprene, synthetic rubber or another sturdy and resistant material, or include such a material. The cavity may alternatively or additionally also be metallic, for example, include or be made from aluminum. A thickness of the cavity along a direction, along which the pressure is exertable, may advantageously be thin so that it may also adapt to a not completely planar shape of the energy store. The thickness of the cavity may, for example, be less than a few millimeters, in particular less than a few tenths of a millimeter, depending on the size of the energy store.

Applying the internal pressure to the cavity should in particular mean that an internal pressure is provided in the cavity as internal pressure in the cavity at a pressure value predetermined or determined during the course of a method or during operation.

The section of the energy storage element on which the pressure is exertable should in particular mean an outer surface, for example, a lateral surface, of a cell, of a cell stack, of a cell winding, or similar. The pressure may in particular be exerted on one side or one section of the winding or the other side of the winding or to both sides of the winding. The section may be a non-contiguous section.

The finding underlying the present invention is that the application of a desired pressure on an energy storage element may be provided particularly advantageously by a cavity situated in the same housing as the energy storage element using an internal pressure.

If, for example, electrodes or electrode windings of one or multiple energy storage elements are under a defined pressure, a contact pressure of the electrodes may be ensured and boundary surfaces or contact resistances may be held at what may be a low level.

For example, in the case of energy storage elements based on lithium, a volume change during charging and/or discharging of the energy storage element through intercalation and de-intercalation of lithium may be decreased or avoided while operating the energy storage element during charging and discharging by exerting the pressure on one or multiple electrodes of the energy storage element. In this way, a negative influence on the service life of the energy storage element may be prevented or decreased.

Applying the pressure in particular on metallic anodes may contribute to minimizing a dendrite growth and to intercepting large volume changes due to the dissolving and deposition of lithium when charging or discharging. In this way, the cyclical service life of the energy storage element may be prolonged and a performance or capacity of the energy storage element may be increased.

According to the present invention, a defined, homogeneous surface pressure may be advantageously exerted on one or multiple electrochemical energy storage elements situated in the housing of the energy store with the aid of the cavity, to which the internal pressure is applied.

If the section is made of lithium or if the section includes lithium, a porosity of the metallic lithium may be maintained at a low level with an increasing number of cycles by applying a permanent pressure.

In this way, as a consequence of the active surface of the lithium which is smaller due to the pressure, decomposition reactions of the lithium with the electrolytes, which are detrimental to the service life of the energy storage element, may be reduced in their frequency.

Pushing back the dendrite growth improves the reliability of the electrical energy store.

By omitting pretensioning devices or similar, a gravimetric as well as a volumetric energy density is increased in comparison to approaches including one or multiple pretensioning device(s).

Moreover, by exerting the pressure, a boundary surface resistance at the energy storage element may be decreased, which enables an improved power rating or performance of the energy storage element or of the energy store.

The present invention is suitable in particular for any type of secondary battery in which volume changes may occur during charging or discharging or in which a contact pressure of electrodes reduces the boundary surface resistances. The present invention is suitable in particular for battery types including metallic anodes or anodes containing silicon, since the volume changes and the associated negative influences on the service life and the power rating of the energy storage elements or the energy store may be particularly great.

If the cavity, to which the internal pressure is applicable, for example, configured as an elastic gas bag or as an elastic gas container, is in contact over its entire surface independently of its shape with a wound or stacked electrode, the exerted pressure may be particularly homogeneous and precise. If multiple energy storage elements, for example, cells, are connected or stacked by an elastic material, for example, in the form of a film, multiple energy storage elements may be subjected to pressure in a weight-saving and/or volume-saving manner by a cavity, to which the internal pressure is applicable, which means that the pressure may be exerted on them.

In some specific embodiments the case may be that the pressure exerted on a cathode of an energy storage element of the energy store does not necessarily result in a better performance of the cathode. Since the applied pressure from the cavity has an effect on the anode just as on the cathode, and according to the present invention has a positive effect on the anode which outweighs the potentially negative effect of the applied pressure on the cathode, the cell performance is improved overall.

Advantageous specific embodiments and refinements result from the subclaims as well as from the description with reference to the figures.

According to a refinement, the cavity is filled/fillable with an inert filling gas, in particular with carbon dioxide or argon. In this way, even in the case of a possibly unintended escaping of the filling gas from the cavity, an undesirable interaction of the filling gas with the energy storage elements may be prevented. However, the cavity may, for example, also be filled or be fillable with common atmospheric air, which makes the energy store technically particularly less complex.

According to another specific embodiment, the cavity is situated in at least one or in at least two spatial directions which are orthogonal toward one another essentially between the energy storage element and the housing. In this way, the internal pressure may be particularly easily applicable to the cavity, for example, through a valve traversing a wall of the housing. In this way, a pressure may also be ensured on the edges of the winding toward the conductor and also on the side facing away from the conductor. A pressure may also be applied in this way on the lateral surface of the winding.

For this purpose, a filling gas, for example, $CO_2$, argon, or air, may be introduced through the valve.

According to an additional refinement, a pressure plate is situated between the cavity and the energy storage element. This may result in an improved pressure transfer between the cavity to which the internal pressure is applied and the energy storage element, for example, a cell or a cell winding.

According to another refinement, the cavity is formed at least partly by an inner surface of the housing. A connection between the inner surface and the remaining part of the cavity, which may, for example, be made of plastic, may take place via welding or bonding. In this way, an advantageous weight saving may be achieved.

According to another refinement, at least one support device is situated inside the cavity, with the aid of which a preset minimal pressure is exertable on the section of the energy storage element using the cavity. This is also the case, for example, when the cavity is not filled with the filling gas. Polyurethane foam or polymer 3D frame structures, for example, are conceivable as support devices. Springs, made of metal or plastic, which may be of plastic for weight reasons, may also be used. Another advantage of springs of plastic or polymers is their easy integration/connection with the material of the gas bag, in particular when it is also made of polymer-based material. As a function of the foam selection or a shape of the support device, the minimal pressure is present and settable due to a spring force of the support device.

According to another refinement, the electrical energy store includes a control unit, the internal pressure which is applicable to the cavity being variable with the aid of the control unit. For this purpose, the control unit may be connected to a compressor. Furthermore, volumes of a cathode and/or anode may change with an intercalation or a de-intercalation of, for example, lithium with respect to the dissolving and deposition of lithium at one metallic electrode. It may occur that a volume buildup at, for example, the cathode does not compensate 1:1 for a volume drop at the anode or vice versa. The internal pressure may therefore be advantageously varied with the aid of the control unit in a manner adapted to such cycles of volume buildup and volume drop.

According to another refinement, at least one pressure sensor, with the aid of which a local pressure value is measurable, is situated inside the housing. The control unit may furthermore be configured to adapt the internal pressure of the cavity based on the measured local pressure value. In this way, for example, an instantaneous pressure on the energy storage element may be determined. The corresponding pressure may then be adapted, if this is determined to be advantageous, by varying the internal pressure in the cavity based on a state of charge of the energy storage element. For this purpose, for example, one or multiple pressure sensor(s) may be distributed on a surface of the energy storage element, for example, a cell stack or winding. The pressure sensors are advantageously at a distance from one another. By setting and optimizing the pressure, in particular as a function of a state of charge of the energy storage element, a cyclical service life and performance of the energy storage element may be improved. A state of charge should in particular mean a charging or discharging of the energy store.

According to a refinement, the method according to the present invention accordingly includes the following additional steps: measuring a local pressure value within the housing; and adapting the internal pressure which is applied to the cavity based on the local pressure value.

The present invention is explained in greater detail with reference to the exemplary embodiments presented in the schematic figures of the drawings.

Unless stated otherwise, identical or functionally equivalent elements and devices are provided with the same reference numerals in all of the figures.

DETAILED DESCRIPTION

Figure 1A:
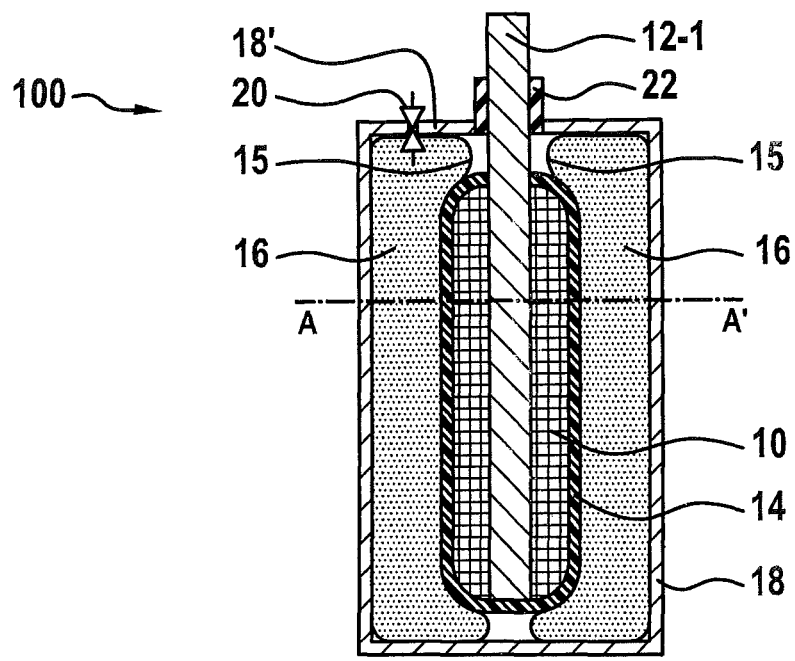
FIG. 1A shows a schematic longitudinal sectional view of an electrical energy store 100 according to a first specific embodiment of the present invention.

FIG. 1A shows a schematic longitudinal sectional view of an electrical energy store 100 according to a first specific embodiment of the present invention. In this figure and the following figures, the proportions are generally not shown true to scale. In particular the size of the cavities and the gas bags may be greatly increased for the sake of clarity.

According to the first specific embodiment, electrical energy store 100 includes a rigid housing 18, which is cuboid in shape inside as well as outside, in which a cell winding 10 of a lithium-ion rechargeable battery is situated. Cell winding 10 is optionally sheathed by a winding jacket 14. Between winding jacket 14 and housing 18, a gas bag 15 is situated within housing 18 which forms a cavity 16. An internal pressure is applicable to gas bag 15 via a valve 20 which traverses an outer wall 18' of housing 18. Gas bag 15, to which the internal pressure is applied, exerts a pressure on a major portion of winding jacket 14, in particular, simultaneously and at essentially the same pressure value as the internal pressure, on two outer surfaces of winding jacket 14 facing away from another. In contrast to what is shown in FIG. 1A, multiple gas bags instead of one may also be used.

Cell winding 10 includes one first electrical pole 12-1, which extends through winding jacket 14 and housing 18 toward one outer side of housing 18. An electrical insulation 22, which may also hermetically seal the housing, is situated between first electrical pole 12-1 and housing 18.

Figure 1B:
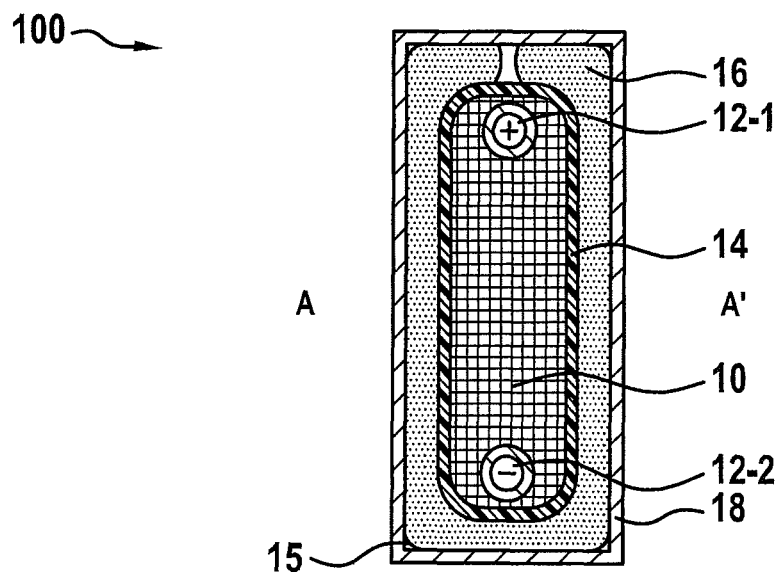
FIG. 1B shows a schematic cross-sectional view of the energy store according to the first specific embodiment of the present invention.

FIG. 1B shows a schematic cross-sectional view of the electrical energy store along plane A-A' of FIG. 1A according to the first specific embodiment of the present invention.

According to FIG. 1B, cell winding 14 is essentially surrounded on all sides in plane A-A' by gas bag 15. In this way, a particularly homogeneous pressure may be exerted on winding jacket 14 and thus on cell winding 10.

FIG. 1B furthermore shows an arrangement of first electrical pole 12-1, here a negative pole, and of a second electrical pole 12-2, here a positive pole. Electrical poles 12-1, 12-2 are electrically conductive rods having what may be a circular cross section, alternatively also an angular cross section, or also a cross section having a U, T or H profile, which are situated in parallel with one another and are configured identically.

Figure 2:
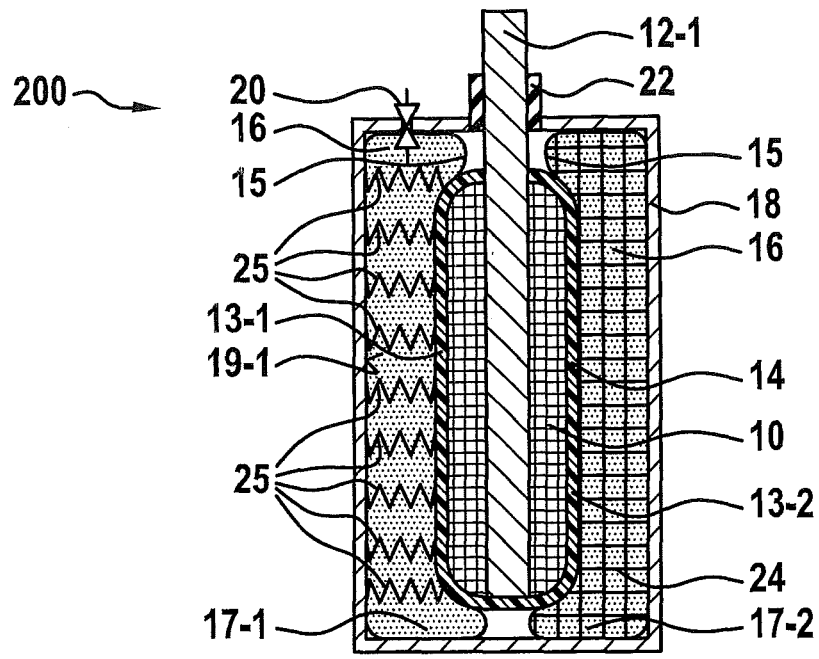
FIG. 2 shows a schematic longitudinal sectional view of an electrical energy store 200 according to a second specific embodiment of the present invention.

FIG. 2 shows a schematic longitudinal sectional view of an energy store 200 according to a second specific embodiment of the present invention.

The second specific embodiment is essentially a variation of the first specific embodiment. In contrast to the first specific embodiment, energy store 200 according to the second specific embodiment includes examples of two possible support devices 24, 25, which are situated inside gas bag 16. To illustrate, according to FIG. 2, a different support device 24, 25 is implemented in each half 17-1, 17-2 of the gas bag situated at different sides of cell winding 10. A plurality of springs 25 are situated in one first half 17-1 of gas bag 16, which are respectively situated between one first inner wall 19-1 of housing 18 and winding jacket 14. One or all or also none of the plurality of springs 25 may be pre-tensioned here with a respectively individual pretension.

In one second half 17-2 of gas bag 16, a frame structure 24 is situated as a support device, which impresses a predefined shape of second half 17-2 of gas bag 16 on second half 17-2 and thus exerts a minimal pressure of second half 17-2 on a second section 15-2 of winding jacket 14 with which second half 17-2 makes contact. An identical support device may also be provided in both halves 17-i. An identical support device may also be provided in one half 17-i only.

Figure 3:
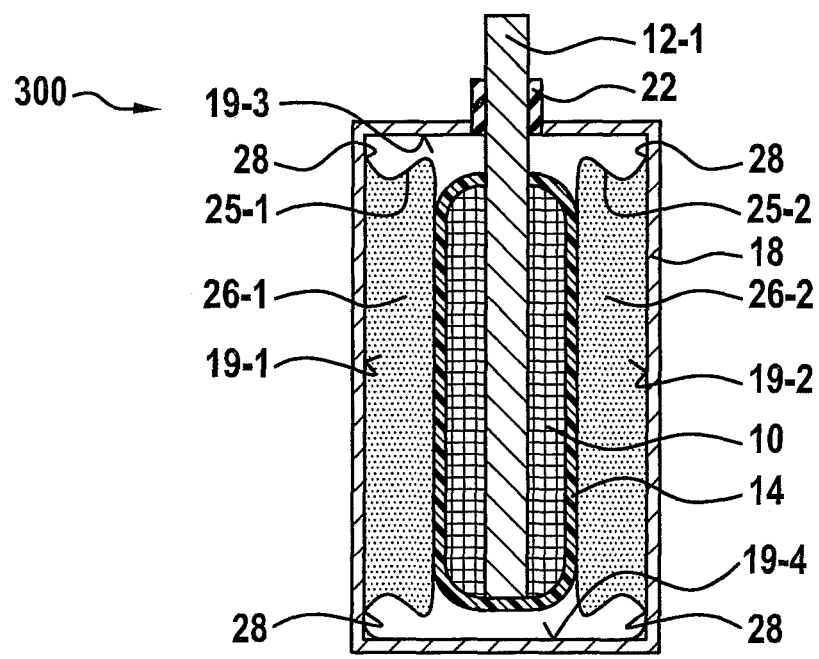
FIG. 3 shows a schematic longitudinal sectional view of an electrical energy store 300 according to a third specific embodiment of the present invention.

FIG. 3 shows a schematic longitudinal sectional view of an electrical energy store 300 according to a third specific embodiment of the present invention.

Energy store 300 according to the third specific embodiment is essentially a variant of energy store 100 according to the first specific embodiment. In contrast to this, energy store 300 includes two separate gas bags 25-i. Each gas bag 25-i may include its own valve or be configured without a valve, i.e., implemented with the desired internal pressure applied to it.

One first cavity 26-1 is formed in a first part by a first gas bag 25-1, and formed in a second part by first inner surface 19-1 of housing 18. A second cavity 26-2 is formed in a first part by a second gas bag 25-2, and formed in a second part by second inner surface 19-2 of housing 18. First inner surface 19-1 of housing 18 faces second outer surface 19-2 of housing 18 and vice versa. First and second electrical poles 12-1, 12-2 are situated in parallel to first and second inner surfaces 19-1, 19-2 of housing 18. First and second electrical poles 12-1, 12-2 protrude through a third inner surface 19-3 of housing 18 to outer surface of housing 18. Third inner surface 19-3 of housing 18 faces a fourth inner surface 19-4 of housing 18 and vice versa.

First cavity 26-1 applied with internal pressure exerts the pressure on a first section 13-1 of winding jacket 14. Second cavity 26-2 applied with internal pressure exerts the pressure on a second section 13-2 of winding jacket 14. First and second sections 13-$i$ of winding jacket 14 face away from one another.

According to the third specific embodiment, gas bags 25-1, 25-2 are folded similarly to bellows at their respective ends facing in the direction of third and fourth inner surfaces 19-3, 19-4 of housing 18. A greater variability of the volume of the cavities 26-1, 26-2 may thus be achieved. In order to form cavities 26-1, 26-2, gas bags 25-1, 25-2 are connected in a fixed, in particular gas-tight manner, via welded joints or adhesive bonds 28 to first or second inner surface 19-1, 19-2 of the housing.

Figure 4:
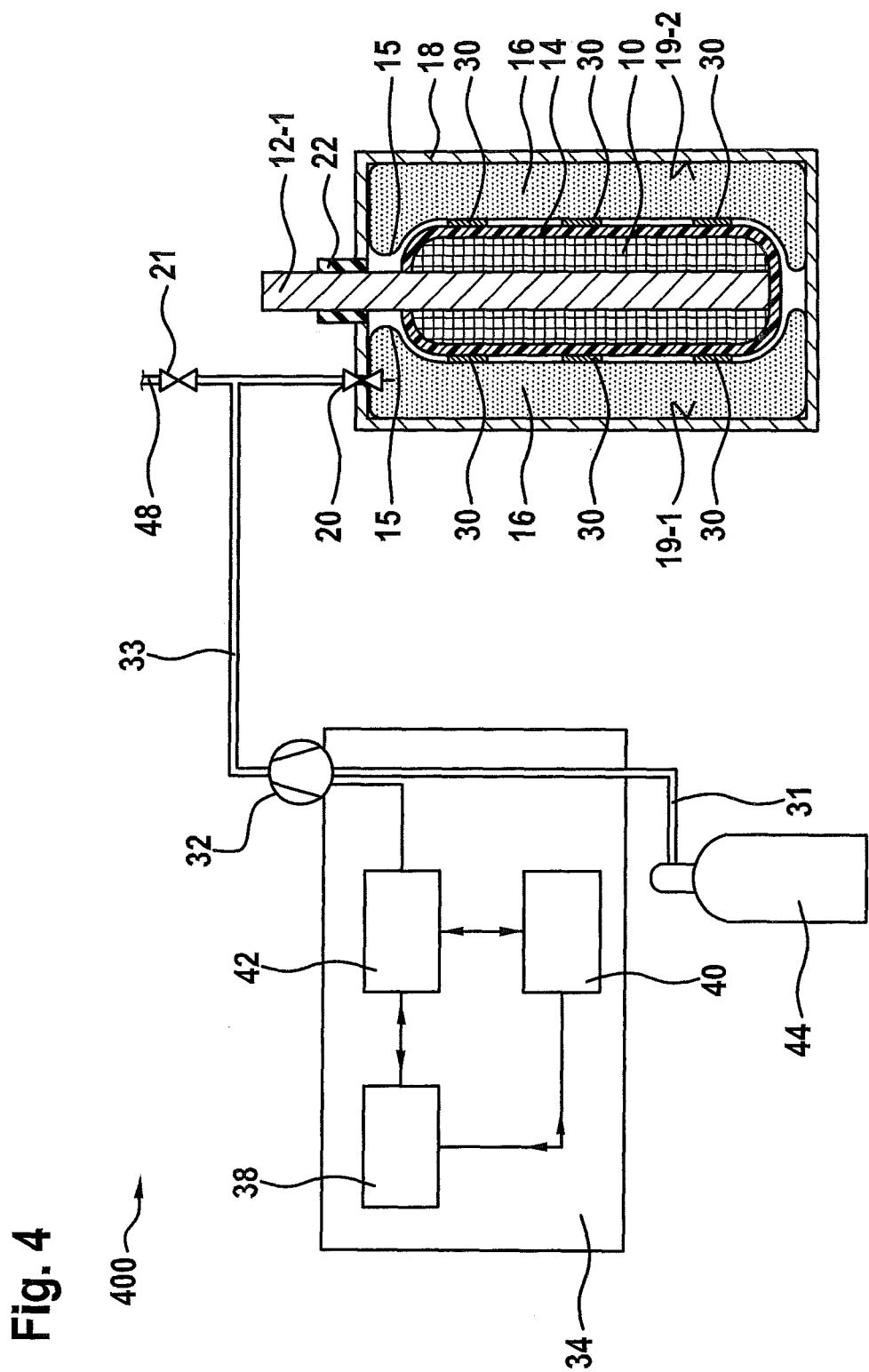
FIG. 4 shows a schematic longitudinal sectional view of an electrical energy store 400 and a schematic block diagram of a control unit according to a fourth specific embodiment of the present invention.

FIG. 4 shows a schematic longitudinal sectional view of an energy store 400 according to a fourth specific embodiment of the present invention, as well as a schematic block diagram of a control unit 34 of energy store 400.

Energy store 400 according to the fourth specific embodiment is essentially a variant of energy store 100 according to the first specific embodiment. In contrast to the first specific embodiment, it is provided according to the fourth specific embodiment that a plurality of pressure sensors 30 is situated at winding jacket 14, in particular between winding jacket 14 and gas bag 15. Pressure sensors may optionally also be used in one or all other described specific embodiments.

According to the fourth specific embodiment, one half of the pressure sensors 30 is situated at first section 13-1 of winding jacket 14 and a second half of pressure sensors 30 is situated at second section 13-2 of winding jacket 14. With the aid of pressure sensors 30, a local pressure value is respectively measurable at a position of the corresponding pressure sensor 30. Pressure sensors 30 are configured to transmit the respective pressure value measured by them to a pressure value computing device 40 of control unit 34 of energy store 400. The transmission may take place wirelessly, for example; pressure sensors 30 may, however, also be connected via cables, which, for example, are hermetically sealed and transverse housing 18 of energy store 400, to pressure value computing device 40.

Pressure value computing device 40 is configured to transmit information about the measured local pressure values to a compressor control 42 of control unit 34. Compressor control 42 may in turn be configured to transmit measuring instructions to pressure value computing device 40, for example, to measure at a certain pressure sensor 30 and/or at a certain point in time, etc. Accordingly, pressure value computing device 40 may furthermore be configured to control pressure sensors 30 according to predetermined or according to receivable measuring instructions, for example, from compressor control 42.

Control unit 34 furthermore includes a battery management system 38 (BMS) with the aid of which a charging and/or discharging of the energy storage element 10 is controllable. Such a battery management system 38 may obviously also be provided for the previously described energy stores 100 through 300 according to the first through third specific embodiments and/or for energy store 500, 600 according to one of the fifth and sixth specific embodiments described below. Pressure value computing device 40 may furthermore be configured to transmit information about the measured local pressure values to battery management system 38. Battery management system 38 may be configured to adapt the pressure during charging and/or discharging to a volume change of energy storage element 10 in response to the transmitted information about the pressure values. Moreover, battery management system 38 may be configured to transmit instructions to pressure value computing device 40. Furthermore, battery management system 38 is configured to transmit control instructions to compressor control 42. Compressor control 42 is configured to transmit to battery management system 38 feedback messages, based on which battery management system 38 may adapt the charging and/or discharging of energy storage element 10.

Based on the transmitted pressure values as well as the control instructions of battery management system 38, compressor control 42 controls a compressor 32. Compressor 32 is connected via a first gas duct 31 for gas exchange, in particular of the filling gas, to a gas reservoir 44, which includes a supply of the filling gas used for applying to cavity 16, i.e., for filling gas bag 15. Alternatively, compressor 32 may be connected via first gas duct 31 to an air intake valve, for example, when air is to be used as filling gas.

Via a second gas duct 33, which is formed in a T shape, compressor 32 is connected to valve 20 as well as to an additional valve 21. A pressure generatable at compressor 32 may be transmitted as internal pressure to gas bag 15 via valve 20. Additional valve 21 is a gas outlet via which the filling gas may be discharged from energy store 400 to an environment 48.

Figure 5:
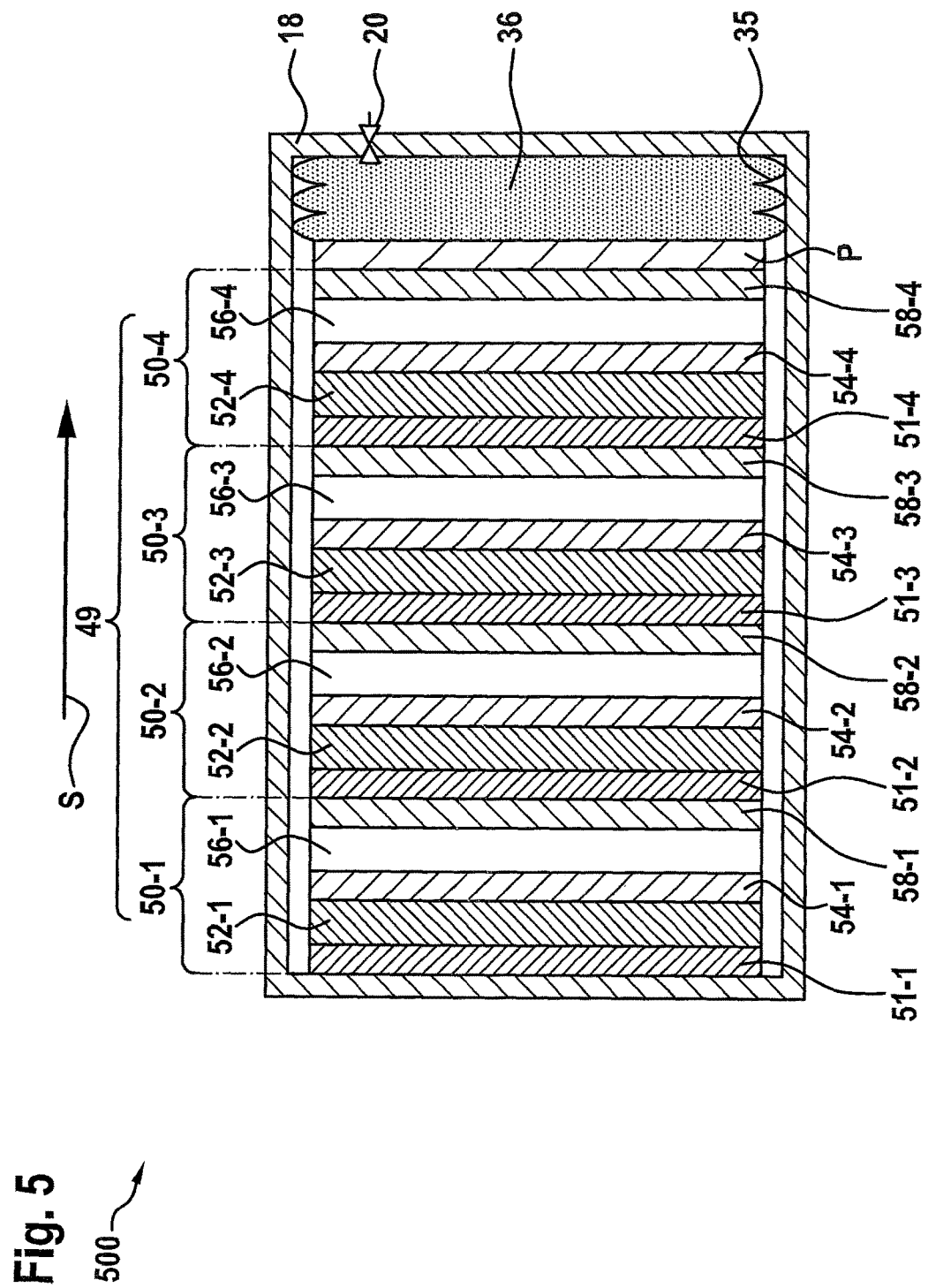
FIG. 5 schematically shows a cross-sectional view of an energy store 500 according to a fifth specific embodiment of the present invention.

FIG. 5 shows a schematic cross-sectional view of an energy store 500 according to a fifth specific embodiment of the present invention. For the sake of clarity, no electrodes for picking up the voltage from the energy store are shown in FIG. 5.

According to the fifth specific embodiment, a housing 18', which is cuboid in shape inside as well as outside, of energy store 500 encloses four electrical energy storage cells 50-1, 50-2, 50-3, 50-4 combined into a cell stack 49 along a stack direction S. In particular contact surfaces of the individual energy storage cells 50-$i$ are perpendicular to the stack direction S. The individual energy storage cells 50-$i$ respectively include an anode current conductor 51-$i$, an anode 52-$i$, a separator 54-$i$, a cathode 56-$i$, and a cathode current conductor 58-$i$, which are respectively stacked against each other in this order within the cell stack. In particular a separator 54-$i$ respectively separates anode 52-$i$ and cathode 56-$i$ of the same energy storage cell 50-$i$. Cathode current conductor 58-1 of a first energy storage cell 50-1 abuts anode current conductor 51-2 of a second energy storage cell 50-2. Cathode current conductor 58-$i$ of the ith energy storage cell 50-1 abuts anode current conductor 51-($i$+1) of ($i$+1)th energy storage cell 50-($i$+1). One exception is the last cathode current conductor 58-4 in stack direction S.

Cathode current conductor 58-4 of fourth energy storage cell 50-4 abuts flush against a pressure plate P. Fourth energy storage cell 50-4 is a last energy storage cell 50-$i$ of the cell stack of energy store 500. One outer surface of the cathode current conductor 58-4, which makes contact with pressure plate P, faces away from the entire cell stack and may be flush with the cell stack. This means that a projection of cell stack 49 to a plane, in which pressure plate P is essentially situated, is essentially congruent with a projection of pressure plate P in this plane. Within housing 18', between pressure plate P and housing 18', gas bag 35 is situated on a side of pressure plate P facing away from cell stack 49.

Via valve 20, which extends through housing 18', gas bag 35 is fillable with the filling gas, which means that cavity 36 formed by gas bag 35 is applicable with an internal pressure. If the internal pressure of gas bag 35 exceeds a minimum value which is dependent on the construction, a pressure is exerted on pressure plate P, this pressure being parallel to stack direction S and pressing entire cell stack 49 against an inner surface of housing 18', which is situated on a side of cell stack 49 facing away from gas bag 35.

Figure 6:
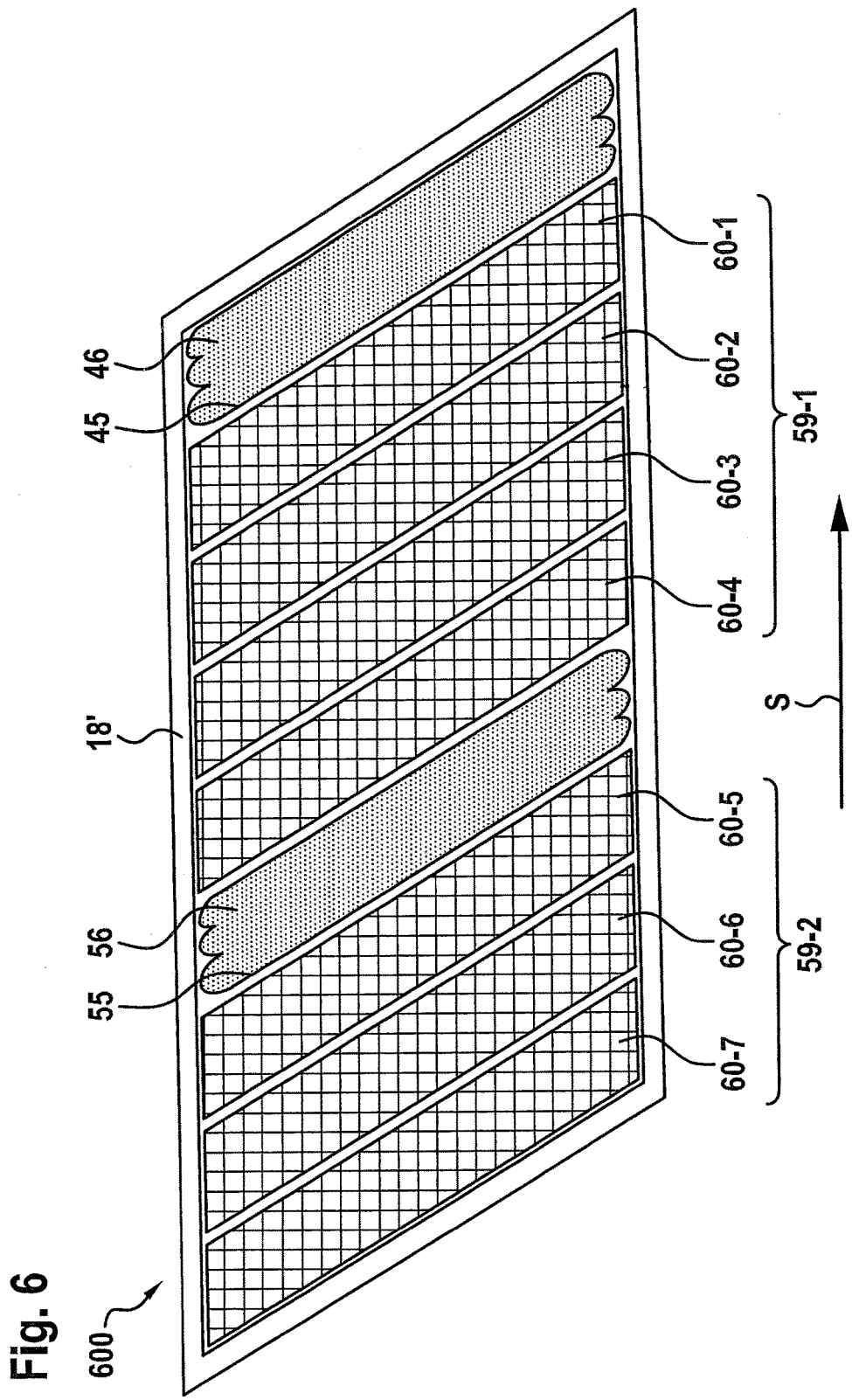
FIG. 6 schematically shows an oblique cross-sectional view of an energy store 600 according to a sixth specific embodiment of the present invention.

FIG. 6 schematically shows an oblique cross-sectional view of an energy store 600 according to a sixth specific embodiment of the present invention.

Energy store 600 according to the sixth specific embodiment is essentially a variant of energy store 500 according to the fifth specific embodiment. In contrast to that, according to the sixth specific embodiment, a first gas bag 45 and a second gas bag 55 are provided within housing 18' to accordingly form a first cavity 46 and a second cavity 56. Additional gas bags in any arbitrary number and position may also be introduced, for example, only at the beginning or at the end of the stack.

In the outlined specific embodiment, a first cell stack 59-1 including first through fourth energy storage cells 60-1 through 60-4 as well as a second cell stack 59-2 including fifth through seventh energy storage cells 60-5 through 60-7 are situated in housing 18'. For the sake of clarity, the individual components of the energy storage cells, which are configured analogously to the individual layers of energy storage cells 50-$i$ according to the fifth specific embodiment, are not plotted individually in FIG. 6.

According to the sixth specific embodiment, first gas bag 45 is situated directly between housing 18' and first cell stack 59-1. Second gas bag 55 is situated between first and second cell stacks 59-1, 59-2. In other words, initially first gas bag 45, then first cell stack 59-1, then second gas bag 55 and finally second cell stack 59-2 are situated in stack direction S beginning from an inner surface of housing 18'. By respectively applying an internal pressure to first and second gas bags 45, 55, pressures may be exerted on first and second cell stacks 59-$i$. The internal pressure of the first cell stack and the internal pressure of the second cell stack 59-1, 59-2 may be equal but also different. A control unit may adapt the respective internal pressure of one of the gas bags 54-I independently of the internal pressure of the respective other gas bag 55-$i$, for example in accordance with locally measured pressure values or information of a battery management system, for example as described with reference to FIG. 4.

FIGS. 7A through 7F show different specific embodiments of gas bags which are suitable for forming the cavity within the housing of one of the energy stores according to the present invention.

The advantageous embodiments for gas bags 80-1 through 80-6 shown in FIGS. 7A through 7F for use in an energy store 100 through 600 according to the present invention respectively have a longitudinal plane L-1 through L-6, which functions as mirror-symmetrical planes for the respective gas bags 80-1 through 80-6. Gas bags 80-1 through 80-6 are advantageously positioned in the housing of the energy store according to the present invention in such a way that longitudinal plane L-$i$ is parallel to one inner surface of the housing, in particular to one such inner surface against which gas bag 80-$i$ abuts.

The different embodiments of gas bags 80-$i$ essentially differ in their configuration of those ends of gas bags 80-$i$, through which particular longitudinal plane L-$i$ extends, i.e., along which longitudinal plane L-$i$ those ends are situated. When applying the internal pressure to gas bags 80-$i$, gas bags 80-$i$ are essentially extendable along their respective direction of extension D, as indicated in FIGS. 7A through 7F using double arrows. Direction of extension D is advantageously perpendicular to the particular longitudinal plane L-$i$ of gas bag 80-$i$.

Figure 7A:
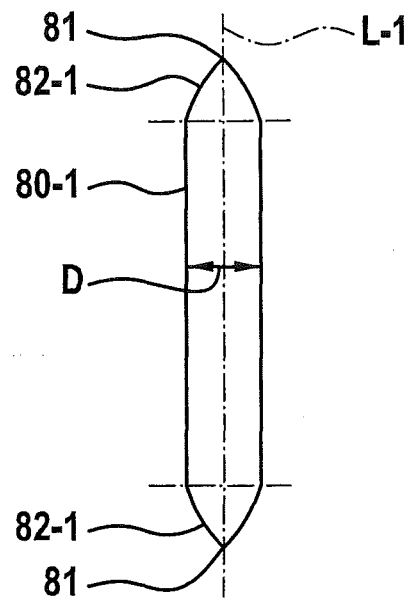
FIGS. 7A through 7F show different specific embodiments of gas bags which are suitable for forming a cavity of one of the energy stores according to the present invention.

According to FIG. 7A, one gas bag 80-1 includes, according to one first embodiment, one or two seams 81 which are situated in the longitudinal plane L-1 of gas bag 80-1 at two opposing ends 82-1 of gas bag 80-1.

Figure 7B:
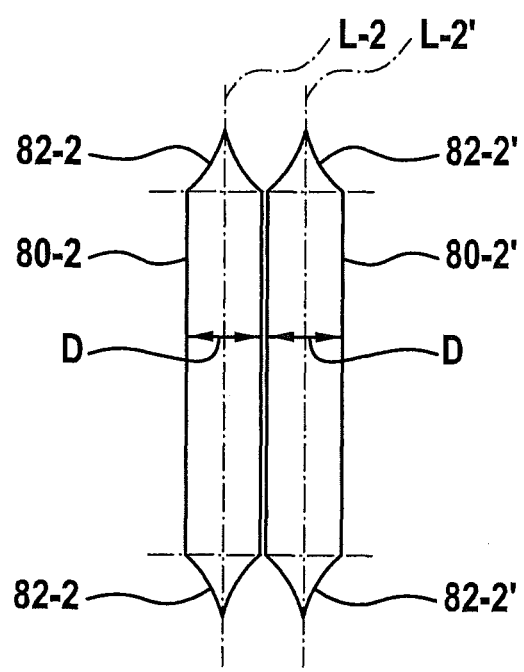

FIG. 7B shows two gas bags 80-2, 80-2' with longitudinal planes L-2, L-2' and ends 82-2, 82-2'. The two gas bags 80-2, 80-2' are, according to the first embodiment, configured identically to gas bag 80-1 in FIG. 7A. Where initially one single gas bag is provided in the energy stores according to the present invention, it is also possible for two or multiple directly adjacent gas bags 80-2, 80-2' to be provided which may include, for example, different filling gasses and/or different or equal internal pressures. It is also possible for multiple gas bags having different embodiments to be directly adjacent, for example, having embodiments of other gas bags 80-$i$. Gas bags may also be configured asymmetrically, i.e., with different ends along a longitudinal axis or also without a longitudinal axis which functions as a mirror symmetrical axis, for example.

Figure 7C:
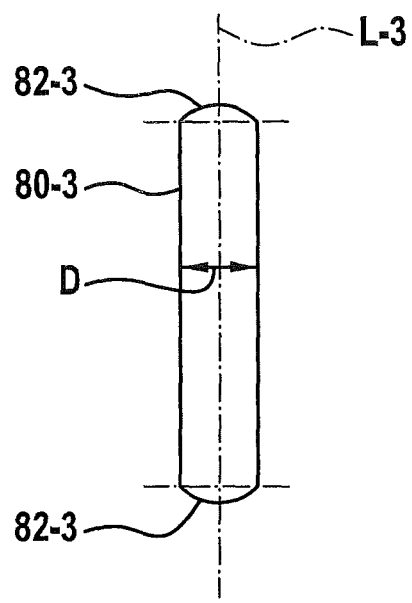

FIG. 7C shows a gas bag 80-3 according to a second embodiment having a longitudinal plane L-3, whose ends 82-3 are traversed by longitudinal plane L-3 and are curved in a convex shaped with respect to gas bag 80-3.

Figure 7D:
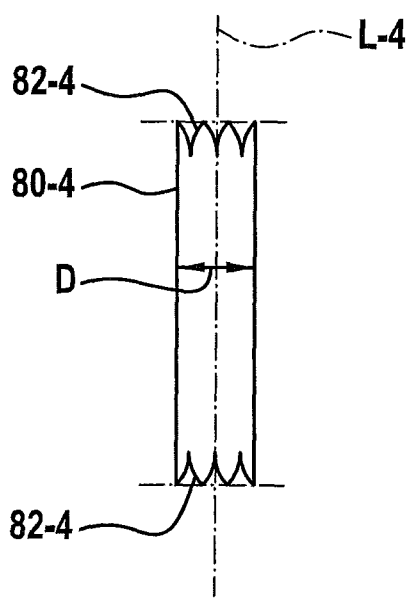

FIG. 7D shows a gas bag 80-4 according to a third embodiment having a longitudinal plane L-4 whose ends 82-4 are traversed by longitudinal plane L-4 and are folded similarly to bellows.

Figure 7E:
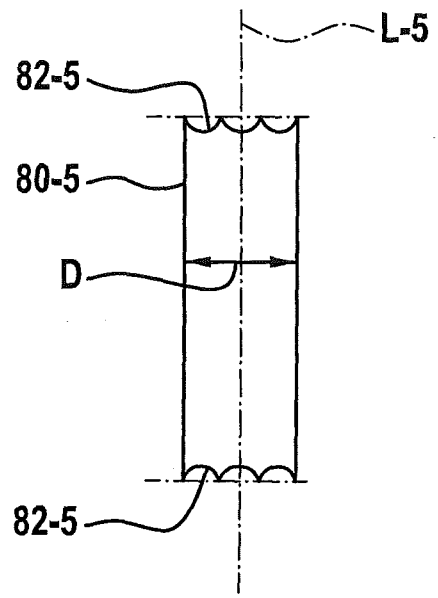

FIG. 7E shows a gas bag 80-5 having a longitudinal plane L-5 according to a fourth embodiment whose ends 82-5 are traversed by longitudinal plane L-5, respectively having three concave folds similar to bellows which are interconnected at an acute angle.

Figure 7F:
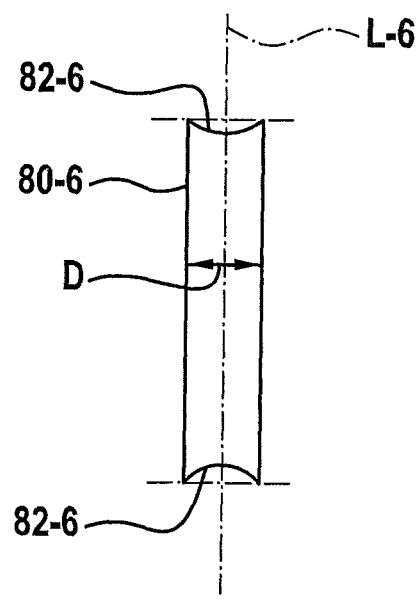

FIG. 7F shows a gas bag 80-6 according to a fifth embodiment having a longitudinal plane L-6 whose ends 82-6 are traversed by longitudinal plane L-6 and are respectively configured concavely.

Figure 8:
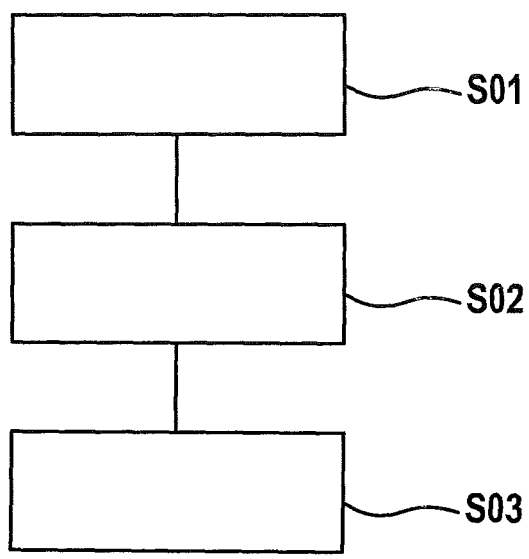
FIG. 8 shows a schematic flow chart to explain a method for operating an electrical energy store according to a seventh specific embodiment of the present invention.

FIG. 8 shows a schematic flow chart to explain a method for operating an electrical energy store according to a seventh specific embodiment of the present invention.

In a first step S01, gas-tight cavity 16; 26; 36; 46, 56 to which the internal pressure is applicable, situated in housing 18; 18' of energy store 100; 200; 300; 400; 500; 600, is subjected to the internal pressure. In this way, the pressure is exerted on at least the section of energy storage element 10; 50-$i$; 60-$i$.

In a second step S02, a local pressure value is measured within housing 18. This may take place, for example, using pressure sensors 30 situated in housing 18, for example as explained in FIG. 4, and in the corresponding description.

In one method step S03, the internal pressure which is applied to cavity 16; 26; 36; 46, 56 is adapted based on the local pressure value. This may take place, for example, using control unit 34 as explained in FIG. 4 and the associated description.

All method steps may naturally be adapted by those skilled in the art according to the preceding and the following variants and refinements of energy stores 100 through 600 according to the present invention.

Although the present invention has been described above with reference to exemplary embodiments, it is not limited thereto, and is modifiable in numerous ways. In particular, the present invention may be changed or modified in various ways without departing from the core of the present invention.

For example, instead of one or multiple gas bags within the housing, the cavity to which the internal pressure is applicable may be formed by a cell stack or a cell winding being wrapped in an inert film and a gap between the cell stack or the cell winding being filled or being fillable with the filling gas so that the gap as the cavity may be applicable with the desired internal pressure. This may result in additional advantageous weight saving.

It is also conceivable that the cavity to which the internal pressure is applicable is completely or partly filled with a gas-permeable polyurethane foam which functions as a support device. Such reinforcing and/or supporting support devices may be positioned inside of the cavity in order to, in addition to preventing punctiform bulges of the cavity at specific places of the energy storage element, exert an additional pressure component in addition to a pressure component exerted by the internal pressure of the cavity.

What is claimed is:

1. An electrical energy store, comprising:
   a housing; and
   at least two energy storage elements situated in the housing;
   wherein there is at least one gas-tight cavity, to which an internal pressure is applicable, situated in the housing between the at least two energy storage elements, with the aid of which a pressure is exertable on at least one section of the energy storage element by applying the internal pressure to the cavity.

2. The energy store of claim 1, wherein the cavity is filled with an inert filling gas.

3. The energy store of claim 1, wherein a pressure plate is situated between the cavity and the energy storage element.

4. The energy store of claim 1, wherein at least one support device is situated within the cavity, with the aid of which a preset minimal pressure may be exerted on the section of the energy storage element by the cavity.

5. The energy store of claim 1, further comprising:
   a control unit to control a varying of the internal pressure, which is applicable to the cavity.

6. The energy store of claim 5, further comprising:
   at least one pressure sensor situated within the housing, with the aid of which a local pressure value is measurable;
   wherein the control unit is configured to adapt the internal pressure of the cavity based on the measured local pressure value.

7. The energy store of claim 1, wherein the cavity is filled with an inert filling gas, which includes carbon dioxide or argon.

8. A method for operating an electrical energy store, the method comprising:
   applying an internal pressure to a gas-tight cavity, to which an internal pressure is applicable, situated in a housing of the energy store between at least two energy storage elements situated in the housing;
   wherein a pressure is exerted on the energy storage elements.

9. The method of claim 8, further comprising:
   measuring a local pressure value within the housing; and
   adapting the internal pressure which is applied to the cavity based on the local pressure value.

* * * * *